June 11, 1929.  A. L. STOWELL  1,716,744
LINE LEVEL
Filed Aug. 17, 1926
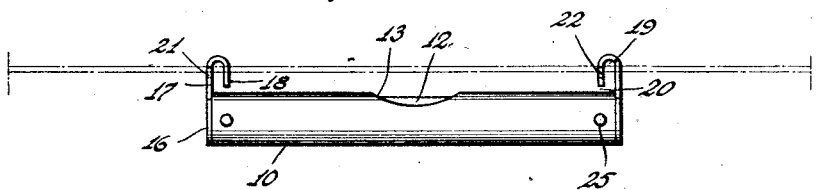
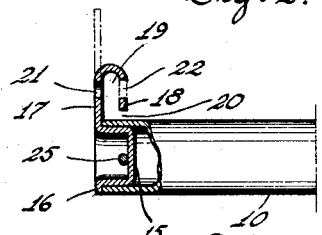
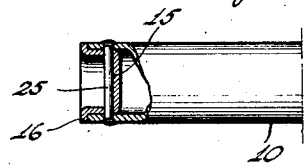
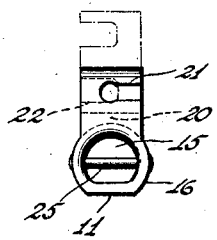
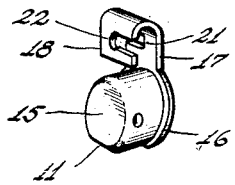
Inventor
Austin L. Stowell
By T. Clay Lindsey
His Attorney Patented June 11, 1929.

1,716,744

UNITED STATES PATENT OFFICE.

AUSTIN L. STOWELL, OF NEW BRITAIN, CONNECTICUT, ASSIGNOR TO THE STANLEY WORKS, OF NEW BRITAIN, CONNECTICUT, A CORPORATION OF CONNECTICUT.

LINE LEVEL.

Application filed August 17, 1926. Serial No. 129,787.

This invention relates to line levels, and has as its objects to provide a level of this sort which is characterized by its lightness in weight, its economy in manufacture, and its effectiveness in use.

More particularly, an aim of the invention is to provide a line level with improved means whereby the same may be very quickly, simply and easily engaged with, and disengaged from, a line, such means being so constructed and arranged that it is virtually impossible to shake or dislodge the level from a line with which it is engaged.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein I have shown, for illustration, one of the embodiments which the present invention may take:

Figure 1 is a side elevational view of my improved level suspended from a line;

Fig. 2 is a sectional view taken vertically and longitudinally through one end of the level;

Fig. 3 is a view taken centrally and horizontally through one end of the level;

Fig. 4 is an end elevational view of the level; and

Fig. 5 is a perspective view of one of the hook attachments.

Referring to the drawings in detail, 10 designates a tubular casing of any suitable construction and of any desired material. By preference, the casing is made of aluminum for the sake of lightness, and the bottom of the casing is flat, as at 11. Secured within the casing in any suitable manner is a spirit tube 12 which may be observed through a sight opening 13 in the upper side of the casing.

Secured to each end of the casing is a hook attachment which, in the present illustrative disclosure, includes means for closing the end of the tubular casing and a hook for attaching the level to a line. Each of these hook attachments by preference, includes a cup-shaped plug 15 adapted to fit closely within the end of the casing 10. This cup-shaped plug has a circumferential flange 16 corresponding in diameter to, and adapted to fit against, the end edge of the casing. Formed integrally with the cup-shaped plug 15 is a hook which is in the form of a strip or lug bent back upon itself into U-shape so as to provide a pair of arms 17 and 18 preferably in parallelism with each other and at right angles to the length of the level. These arms are spaced apart so as to provide a clearance 19 between them, and the lower end of the arm 18 terminates short of the casing so as to provide an entrance 20. The arm 17 has, extending from one edge thereof to slightly past its medial line, a notch 21, and the other arm 18 has a notch 22 generally similar to the notch 21 but somewhat larger and extending from the opposite edge of the arm 18. The slots 21 and 22 are preferably in the same transverse plane and overlap, as shown most clearly in Fig. 4, so as to provide a through, straight passage, for the line. The hook attachments may be secured in place in any suitable manner, as, for example, by means of riveted pins 25.

One of the notches of each hook attachment, preferably the notch 22 of the arm which is nearer the center of the level, is slightly larger than the other notch 21 so that, when the level is hooked onto a line, there is a slight clearance between the edge of the notch 22 and the line. Thus, it will be seen that the arm 17 constitutes a hook while the arm 18 does not engage the line and constitutes a guard to prevent the line from coming out of the notch 21. The advantage of this arrangement is that the arms 17 take the entire responsibility of accuracy between the line and the level and, in the event that the U-shaped portions of the hook attachments should inadvertently become bent, thereby displacing the arms 18 relative to the arms 17, the edges of the notches 22 would not engage the line and disturb the accuracy of the device. It will thus be noted that the guards, constituting the notched arms 18, are provided with a clearance about the line for the express purpose of avoiding inaccuracies in the level due to accidental bending of these guards.

From the foregoing description, taken in connection with the accompanying drawings, it will be obvious that my improved level is very simple in construction and may be economically made. Each of the hook attachments may be formed of sheet metal by cutting a blank to the desired configuration and drawing the plug 15 to the cup shape shown. The blank, with the slots 21 and 22 formed therein, may be turned over from the position shown in dotted lines in Figs. 2 and 4 to the full lines shown in those figures, thereby bringing the hook into U-shape in longitudinal section and the inner ends of the slots or notches 22 and 21 into registry. The cup-shaped plugs effectively close the ends of the casing and constitute anchors for the hooks. The level may be very quickly applied to a line by inserting the line through the entrance 20 and into the clearance 19 and then relatively moving the line and the level so as to bring them into parallelism with each other. After the level has been hooked onto the line, it cannot possibly be shaken loose although the line may be quite slack.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, might be said to fall therebetween.

I claim as my invention:

1. A line level including a casing having a sight opening, a spirit tube mounted within the casing, and a hook attachment for securing the casing to a line, the hook attachment including an integral U-shaped member extending above the casing and having its arms spaced apart slightly in the direction of its length, one of said portions having a transverse notch open at one side of and spaced above the casing, the other of said portions having a similarly placed notch open at the other side of the casing, the inner ends of said notches slightly overlapping to provide a passage for the line, one of said notches being larger than the other one so as to clear the line.

2. A line level including a casing having a sight opening, a spirit tube mounted therein, and a hook attachment including a hook having an inverted U-shape providing a pair of spaced parallel arms, said arms having, in their opposite edges, transversely extending notches with the inner ends of the notches in overlapping relation.

3. A line level including a casing having a sight opening, a spirit tube mounted therein, and a hook attachment including a hook having an inverted U shape providing a pair of spaced parallel arms, said arms having, in their opposite edges, transversely extending notches with the inner ends of the notches in overlapping relation, one of said notches being larger than the other one so as to clear the line.

4. A line level having a tubular casing provided with a sight opening, a spirit tube therein, an integral sheet metal hook attachment at each end of said casing, each of said hook attachments including a cup-shaped plug fitting in the end of the tubular casing and a hook formed integrally with said plug and extending above said casing and pins extending through said casing and plugs for securing said attachments in place.

5. A line level having a tubular casing provided with a sight opening, a spirit tube therein, and a hook attachment formed of sheet metal and including a cup-shaped plug fitting in the end of the casing and a U-shaped hook formed integrally with the plug and having a pair of parallel arms provided in their opposite side edges with transversely extending notches, the inner ends of which overlap.

6. A line level including a casing having a sight opening, a spirit tube mounted within the casing, and line engaging means for suspending the casing from a line, said means including an integral U-shaped projection above the casing, one arm of said projection having an opening extending from one edge inwardly to a point beyond the center of the casing, the other arm of said projection extending across and overlapping the entrance to said opening and spaced from said first arm.

7. A line level including a casing having a sight opening, a spirit tube mounted within the casing, and line engaging means for suspending the casing from a line, said line engaging means including a sheet metal arm extending upwardly from, and disposed in a plane at right angles to, the length of said casing, said arm having a notch spaced above, and formed independently of, said casing and extending inwardly from the edge of the arm to a point beyond the center of the casing, said line engaging means also including an arm formed integrally with the first mentioned arm and extending from an edge thereof, said second mentioned arm being bent alongside of the first mentioned arm and extending across and overlapping the entrance of the notch in said first mentioned arm.

AUSTIN L. STOWELL.